ём

2,931,828
CARBAMATE OF PROPINYL, CYCLOHEXANOL

Maurice Prost, Brussels, Belgium, assignor to Societe Belge des Laboratoires Labaz, Brussels, Belgium No Drawing. Application November 21, 1956
Serial No. 623,535

Claims priority, application Germany November 24, 1955

1 Claim. (Cl. 260—482)

The present invention relates to carbamic esters or carbamates of propinylcarbinols having sedative and hypnotic properties.

Compounds covered by the present invention have the general formula

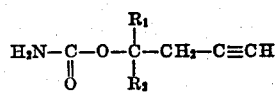

in which $R_2$ is selected from the group consisting of hydrogen and a methyl radical, $R_1$ is a radical selected from the group consisting of aliphatic and aromatic radicals when $R_2$ is hydrogen and aliphatic and cyclopropyl radicals when $R_2$ is methyl, and $R_1$ and $R_2$ may, with the carbon atom to which they are attached, form a cycloaliphatic group such as cyclopentyl, cyclohexyl or cycloheptyl.

Thus, compounds, wherein $R_1$ and $R_2$, with the carbon atom to which they are attached, form a cycloaliphatic group, may be represented by the general formula

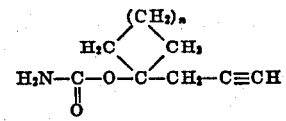

wherein $n$ is an integer from zero to four, preferably two to four.

The preferred compound has the formula

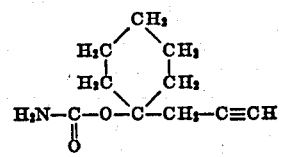

The compounds of the present invention are propinyl compounds; the acetylenic group is once removed from the carbon atom which is "esterified" and bears the various substituents; thus there is a methylene group between that carbon atom and the acetylenic group as shown in the formula

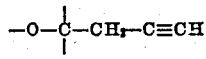

Prior to the present invention, certain acetylenic carbamates having substituents on the "esterified" carbon atom were known, but they were all ethinyl carbamates wherein the acetylenic group is attached directly to the carbon atom bearing the "ester" group and other substituents without an intervening methylene. These compounds are of the following type:

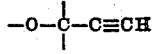

Such ethinyl carbamates are disclosed in a group of corresponding patents (Belgium 518,938; Austria 180,566; France 1,079,916; and Australia 163,053 and 163,054) and in some scientific papers: Arch. exper. Pathol. u. Pharmacol. (1953), 219, 130; J. Pharm. and Expl. Therp. (1954) 112, 480; J. A. Ph. A., Sci. Edit. (1956), 45, 40.

One of these known ethinyl compounds has the following formula

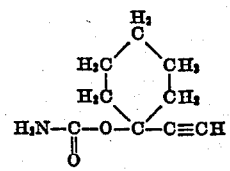

It is of value as a sedative-hypnotic and is the preferred member of this class of ethinyl carbamates.

When administered in identical doses it has been found that the propinyl compounds are more active in their sedative and hypnotic properties than are the corresponding ethinyl compounds, without any increase in toxicity. This will be seen from the following data from tests conducted on mice using the ethinyl and propinyl, cyclohexanol carbamates

| Carbamic Esters of— | Dosage, mg./k. | Hypnotic Effect [1] | $LD_{50}$ [2] |
|---|---|---|---|
| Ethinyl-cyclohexanol | 250 | 190±22 | 400 |
| Propinyl-cyclohexanol | 250 | 400±45 | 450 |

[1] The figures given for the hypnotic activity represent the length of time in minutes elapsing between the loss and recovery of positional reflex by mice which had been laid on their backs.
[2] $LD_{50}$ applies to white mice.

In these tests the propinyl cyclohexyl compound of the present invention was 100% more active than the corresponding ethinyl compound at the 250 mg./kg. dose, and about 10% less toxic. This is a significant, unpredictable difference and demonstrates what a profound effect the insertion of a methylene group between the acetylenic group and the esterified carbon has on the physiological properties of the compound.

That this insertion of the methylene group between the acetylenic group and the esterified carbon is of great and unpredictable significance is further indicated by the fact that there was, among the known ethinyl carbamates, one containing a methyl group on the terminal acetylenic carbon. It had the following formula

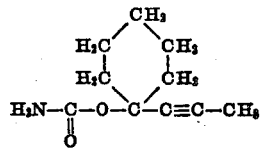

This methyl ethinyl compound is inferentially inferior to the known ethinyl cyclohexanol carbamate. Thus, while available it was not chosen as the preferred compound. This methyl ethinyl compound and the propinyl cyclohexyl compound of the present invention are isomers, and both are homologues of the ethinyl cyclohexyl compound. However, whereas the already known methyl ethinyl compound was not superior to the ethinyl compound it is clear from the above data that the propinyl compound is markedly superior. The methyl ethinyl compound is an ordinary homologue of the ethinyl compound, i.e., it is the latter with a hydrogen replaced by methyl. The propinyl compound is not a true or ordinary homologue; instead it contains a methylene inserted between the acetylenic carbon and the esterified carbon and with it unexpected, unpredictable increases in activity of a very significant magnitude are had.

The very considerable increase in activity obtained with the compounds of this invention is also demonstrated by the following data obtained in tests on mice using the carbamates of phenyl ethinyl and phenyl propinyl carbinols

| Carbamic Esters of— | Dosage, mg./k. | Hypnotic Effect [1] | LD₅₀ [2] |
|---|---|---|---|
| Phenyl-ethinyl-carbinol | 150 | 60 | 275 |
| Phenyl-propinyl-carbinol | 200 | 850 | 250 |

[1] The figures given for the hypnotic activity of the phenyl propinyl carbinol carbamate represent the length of time in minutes elapsing between the loss and recovery of positional reflex by mice which had been laid on their backs. The activity and toxicity values shown for the phenyl ethinyl carbinol carbamate result from trials performed by W. Logemann et al. [Farmaco (Pavia) 8, 406 (1953)].
[2] $LD_{50}$ applies to white mice.

Using a dose of 200 mg./kg., the duration of effect in mice with the carbamate of the phenyl propinyl carbinol in 850 minutes, whereas with the corresponding ethinyl compound it was only 60 minutes, although with the latter the dose was a little lower, 150 mg./kg., that difference in dosage would be insufficient to account for the tremendous difference in effect, and again, the toxicities are essentially alike. Clearly, the propinyl compound is far more active than the corresponding ethinyl compound, and the difference is far beyond what could be anticipated.

It is remarkable that although these compounds are structurally very similar, the compounds of the present invention possess considerably improved hypnotic and sedative properties. This is apparently due to the insertion of the methylene group between the "esterified" carbon atom and the acetylene group.

Carbamates of acetylenic carbinols are also described in J. Org. Chem. (1955), 20, 1379, but again they are all ethinyl compounds; propinyl compounds are not disclosed and the unexpected properties we have been able to demonstrate for the propinyl compounds of our invention could not be anticipated from that disclosure.

The carbamate of the phenyl ethinyl carbinol corresponding to our carbamate of phenyl propinyl carbinol was disclosed (Il. Farmaco (1953) 8, 406 and Brit. Pat. 736,340) but the tremendous activity difference favoring our propinyl compound has been shown in a tabulation above.

The compounds of the present invention may be prepared by reacting a halogenoformate such as phenyl-chloroformate with a secondary or tertiary [(propin-2')yl(1')]-1-carbinol in the presence of a tertiary base such as trimethylamine, pyridine or quinoline.

The carbonate thus obtained is reacted with ammonia to give the corresponding carbamate and phenol. The reaction probably occurs as follows:

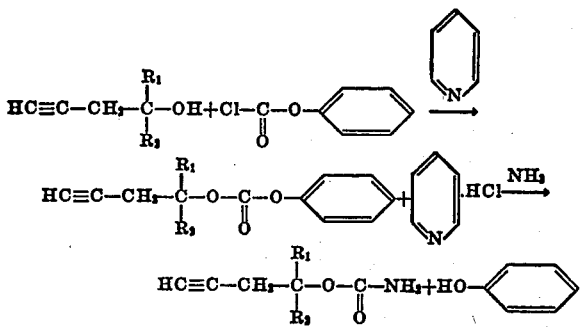

The halogenoformates of the secondary and tertiary [(propin-2')yl(1')]-1-carbinols can also be used as starting product. These are prepared by reacting a halogenoformyl halide, such as phosgene, with a secondary or tertiary [(propin-2')yl(1')]-1-carbinol in the presence of a tertiary base, such as trimethylamine, collidine, quinoline, etc. To effect this reaction, there are two methods which can be followed. The carbinol is mixed with the halogenoformyl halide and the reaction effected by adding the tertiary base, or the halogenoformyl halide is first mixed with the tertiary base and the carbinol subsequently added.

The resultant halogenoformates are treated with ammonia to form the carbamates. The reaction probably occurs as follows:

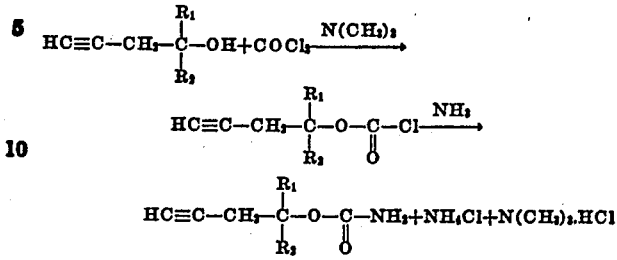

The following examples show in detail the preparation of the compounds of the present invention.

Example 1

To a solution of 8.8 g. (0.07 mole) methyl-1-propyl-1-[(propin-2')yl(1')]-1-carbinol-(1) in 30 cc. pyridine add, while cooling and stirring, 12 g. (0.077 mole) phenyl-chloroformate. Allow to stand for 3 hours at 0° C., then overnight at room temperature; pour onto ice and hydrochloric acid and extract with ether. Wash the ether solution with diluted hydrochloric acid and then with water. Dry over sodium sulfate, completely eliminate the ether and add to the residue a solution of methanol saturated with ammonia. After allowing to stand overnight at room temperature remove the methanol under vacuum and take up the residue in ether.

Wash the ether solution with water, dry, and remove the solvent and the phenol formed during the aminolysis by distillation. Crystallize the cold distillation residue by adding petroleum ether (30–40). Recrystallization from the petroleum ether gives the pure carbamate of methyl-1-propyl-1-[(propin-2')yl-(1')-]-1-carbinol-(1), M.P. 42–44° C.

$C_9H_{15}O_2N$: N calculated=8.27%; N found=8.26%.

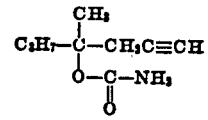

By effecting the required alterations to the molecular weight ratios, methyl-1-isobutyl-1-[(propin-2')yl(1')]-1-carbinol-(1) can be converted to the corresponding carbamate. M.P. 50–52° C. (from petroleum ether), with the following characteristics and formula:

$C_{10}H_{17}O_2N$: N calculated=7.64%; N found=7.50%.

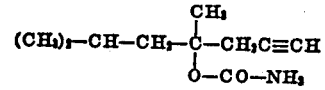

Example 2

To a solution of 14.6 g. (0.10 mole) phenyl-1-[(propin-2')-yl(1')]-1-carbinol-(1) in 40 cc. pyridine add slowly, while cooling and stirring, 17.1 g. (0.11 mole) phenyl-chloroformate. The reaction is performed as described in Example 1 except that the product crystallizes from a smaller volume of ether solution. In this way, 9.2 g. carbamate of phenyl-1-[(propin-2')yl-(1')]-1-carbinol-(1) are obtained. M.P. 98–99° C. (after recrystallization from water-methanol).

$C_{11}H_{11}O_2N$: N calculated=7.40%; N found=7.64%.

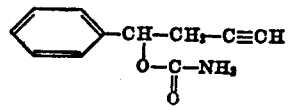

Example 3

Add drop by drop 12.0 g. (0.077 mole) phenylchloroformate to a solution of 9.7 g. (0.07 mole) [(propin-2')yl(1')]-1-cyclohexanol-(1) and 6.1 g. (0.077 mole)

pyridine in 80 cc. anhydrous ether. Allow to stand for three days at room temperature, remove by filtration the pyridine hydrochloride precipitated, wash the filtrate with diluted hydrochloric acid and then with water. After drying, eliminate the ether and to the residue add 100 cc. ammonia-saturated methanol. After 24 hours, remove the excess ammonia and methylalcohol under vacuum and take up the residue again in water and ether. Wash the ether extract with water, dry over sodium sulfate and eliminate the solvent and any phenol formed by distillation. Crystallize the distillation residue by adding petroleum ether (30-40). Thus is obtained 1.6 g. carbamate of [(propin-2')yl(1')]-1-cyclohexanol-(1) in the form of a white crystalline powder. M.P. 97-99° C.

$C_{10}H_{15}O_2N$: N calculated—7.72%; N found= 7.80%.

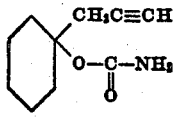

Example 4

To a solution of 36.0 g. (0.23 mole) phenylchloroformate in 60 cc. anhydrous toluene at 0° C., add a solution of 27.6 g. (0.20 mole) [(propin-2')yl(1')]-1-cyclohexanol-(1) in 80 cc. anhydrous toluene. To the resultant solution, at between −3° C. to 0° C. add a solution of 13.6 g. (0.23 mole) trimethylamine in 100 cc. anhydrous toluene. Allow to stand for 2-3 hours at 0° C., then for 1-3 days at 16-18° C. Remove by filtration the trimethylamine hydrochloride precipitated and continue the process as described in Example 3. Thus is obtained the same carbamate of [(propin-2')yl-(1')]-1-cyclohexanol-(1) as in Example 3. M.P. 97-99° C.

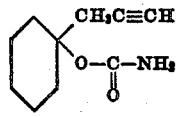

Example 5

At a temperature of between −2° C. and 0° C., add while stirring, a solution of 69.0 g. (0.50 mole) [(propin-2')yl(1')]-1-cyclohexanol-(1) in 250 cc. anhydrous toluene to a solution of 57.0 g. (0.575 mole) phosgene in 175 cc. anhydrous toluene. Then add, drop by drop and at a temperature of between −5° C. and −2° C. a solution of 33.9 g. (0.575 mole) trimethylamine in 185 cc. anhydrous toluene during a period of 2-3 hours. Maintain the resultant solution at between −2° C. and 0° C. for 2-3 hours and then at room temperature for 12-14 hours. Cool to 5° C., filter off the precipitate of trimethylamine hydrochloride and wash the filter a few times with anhydrous toluene taking care that the filter is always wet. In this way, about 90% of the trimethylamine can be recovered in the form of its hydrochloride. Submit the filtrate and the solution used for rinsing to aminolysis for 2-3 hours by means of ammonia gas. When aminolysis is completed, add about 200 cc. water and 2.5 litres ether to the mixture. Eliminate the ammonium chloride solution and wash the ethereal solution with water, 10% sulfuric acid and again with water. Extract the washing water and ammonium chloride solution several times with ether. Combine all the ethereal extracts, dry over sodium sulfate and remove the ether by distillation under atmospheric pressure. Concentrate the toluene solution under water-jet vacuum until crystallization is seen to commence. Allow to stand for 12 hours at 0° C.-5° C. to complete crystallization, filter out the raw carbamate and rinse the filter with a little cyclohexane. Evaporate the mother liquor and rinsing solution to siccity under vacuum, and add about 100 cc. cyclohexane to the residue. Thus a further quantity of carbamate is obtained. The total yield in raw product is 56-58 g. with a M.P. of 90°-97° C. The pure carbamate of [(propin-2')yl(1')]-1-cyclohexanol-(1) is obtained through crystallization in a mixture of cyclohexan and dioxan in the proportion of 5:1, M.P. 97-99° C. This product is identical with that obtained in Examples 3 and 4.

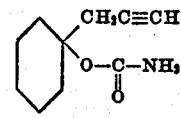

The trimethylamine can be replaced by other tertiary bases (such as, for example, collidine, quinoline).

Example 6

Add, at between −5° C. and −2° C. a solution of 12.4 g. (0.1 mole) cyclopropyl-1-methyl-1-[(propin-2')yl(1')]-1-carbinol-(1) in 40 cc. anhydrous toluene to a solution of 11.4 g. (0.115 mole) phosgene in 35 cc. anhydrous toluene. Into this solution, introduce drop by drop at the same temperature and over a period of 1 hour, a solution of 6.8 g. (0.115 mole) trimethylamine in 40 cc. anhydrous toluene. The remainder of the reaction is performed as described in Example 5, and results in the formation of the carbamate of cyclopropyl-1-methyl-1-[(propin-2')yl(1')]-1-carbinol-(1), M.P. 69°-70° C. (from ether/petroleum ether), with the following formula and characteristics:

$C_9H_{13}O_2N$: N calculated—8.37%; N found=8.35%.

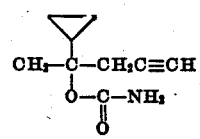

Example 7

Under the same conditions as those described in Example 6, mix a solution of 12.9 g. (0.13 mole) phosgene in 35 cc. anhydrous toluene with a solution of 12.6 g. (0.10 mole) methyl-1-isopropyl-1-[(propin-2')yl(1')]-1-carbinol-(1) in 40 cc. anhydrous toluene. Add drop by drop 7.1 g. (0.12 mole) trimethylamine in 40 cc. anhydrous toluene at −5° C. to effect the reaction. Subsequent treatment of the reaction product is as described in Example 5 which results in the carbamate of methyl-1 - isopropyl-1-[(propin-2')yl(1')] - carbinol - (1), M.P. 90°-91° C. (from toluene), having the following characteristics and formula:

$C_9H_{15}O_2N$: N calculated=8.27%; N found=8.22%.

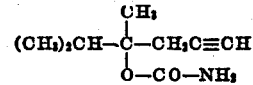

Example 8

Add, over a period of approximately 2 hours, while stirring at between −7° C. and −2° C. a solution of 30.7 g. (0.525 mole) trimethylamine in 170 cc. anhydrous toluene to a solution of 52.0 g. (0.525 mole) phosgene in 160 cc. anhydrous toluene. The resultant compound takes the form of a while precipitate. Within the next two hours, add to this precipitate at a temperature between −3° C. and −1° C. a solution of 62.5 g. (0.45 mole) [(propin-2')yl(1')]-1-cyclohexanol-(1) in 230 cc. toluene. When this operation is terminated, allow the solution to stand for two hours at 0° C. and then 14 hours at 15-18° C.

Next filter out the precipitated trimethylamine hydrochloride and wash several times with anhydrous toluene. Combine the filtrate and the washing solutions and eliminate the excess phosgene.

Slowly add, drop by drop, the solution of propinyl-1- cyclohexanol-chloroformate at 2–4° C., while continually stirring, to a solution of ammonia in 150 cc. anhydrous toluene under a continuous stream of ammonia gas. Maintain the stream of ammonia gas for 2–3 hours after adding the chloroformate. Then add 200 cc. water, while stirring vigorously for 30 minutes, decant from the ammonium chloride solution and wash with water after adding a little toluene, then several times with 10% sulfuric acid and then again with water. After drying over sodium sulfate concentrate the toluene solution. By adding petroleum ether (30–40) 58.2 g. of the carbamate of [(propin-2')yl(1')]-1-cyclohexanol-(1) in crystal form are obtained. This product is identical with that obtained in Examples 3, 4 and 5.

As a variation of this process the reaction of the chloroformate of propinyl-1-cyclohexanol can also be performed with a concentrated aqueous solution of ammonia.

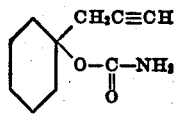

By effecting the required alteration of the molecular weight ratios, the methyl-1-n-butyl-1-[(propin-2')yl-(1')]-1-carbinol-(1) can be converted to the corresponding carbamate. B.P. 98–102° C./1 mm., having the following characteristics and formula:

$C_{10}H_{17}O_2N$: N calculated=7.64%; N found=7.70%.

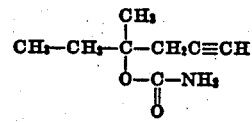

In the same way, the following carbinols are converted to their corresponding carbamates:

| Carbinols | Formulae and characteristics of corresponding carbamates |
|---|---|
| Methyl-1-ethyl-1-[(propin-2')-yl(1')]-1-carbinol-(1). | M.P. 35–36° C. (from petroleum ether). $C_8H_{13}O_2N$: N calculated=9.02%; N found=9.00%. <br><br> CH₃ <br> CH₃—CH₂—C—CH₂C≡CH <br> O—C—NH₂ <br> ‖ <br> O |
| [(propin-2')yl(1')]-1-cyclopentanol-(1). | M.P. 120° C. (from toluene). $C_9H_{13}O_2N$: N calculated=8.37%; N found=8.45%. <br><br> 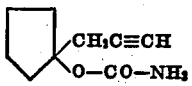 |

| Carbinols | Formulae and characteristics of corresponding carbamates |
|---|---|
| [(propin-2')yl(1')]-1-(methyl-2-cyclopentanol)-(1). | M.P. 86–88° C. $C_{10}H_{15}O_2N$: N calculated=7.72%; N found=7.70%. <br><br> CH₃ <br> CH₂C≡CH <br> O—CO—NH₂ |
| [(propin-2')yl(1')]-1-cycloheptanol-(1). | M.P. 79–81° C. (from toluene). $C_{11}H_{17}O_2N$: N calculated=7.17%; N found=7.17%. <br><br> 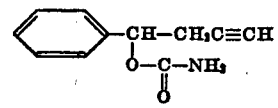 |
| isopropyl-1-[(Propin-2')yl(1')]-1-carbinol-(1). | M.P. 71–72° C. (from cyclohexan). $C_8H_{13}O_2N$: N calculated=9.02%; N found=9.00%. <br><br> (CH₃)₂CH—CH—CH₂C≡CH <br> O—CO—NH₂ |

Example 9

Mix at between −7° C. and −2° C. a solution of 22.8 g. (0.23 mole) phosgene in 70 cc. anhydrous toluene and 13.6 g. (0.23 mole) trimethylamine in 80 cc. anhydrous toluene. Add at 0° C. a solution of 29.2 g. (0.20 mole) phenyl-1-[(propin-2')yl(1')]-1-carbinol-(1) in 80 cc. anhydrous toluene. Subsequent operations are conducted as described in Example 5. Thus are obtained 19.5 g. carbamate of phenyl-1-[(propin-2')yl-(1')]-1-carbinol-(1), which is identical with that obtained in Example 2. M.P. 98–99° C.

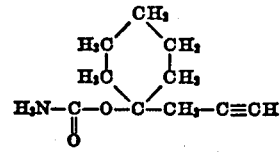

What I claim and desire to protect by Letters Patent is:
A compound having the formula

CH₃
H₃C   CH₂
H₂C   CH₂
H₂N—C—O—C—CH₂—C≡CH
   ‖
   O

References Cited in the file of this patent
UNITED STATES PATENTS
2,816,910    Junkmann _____ Dec. 17, 1957